United States Patent [19]
Knight et al.

[11] 3,822,588
[45] July 9, 1974

[54] APPARATUS FOR MEASURING THE HARDNESS OF MATERIAL

[76] Inventors: Richard Langham Castle Knight, 10 Arnside Ave., Stockfort, England; George H. O. Blenes, 3500 Rutland Ave., Powell River, B. C., Canada

[22] Filed: May 12, 1972

[21] Appl. No.: 252,861

Related U.S. Application Data

[63] Continuation-in-part of Ser. No. 85,928, Nov. 2, 1970, abandoned.

[52] U.S. Cl. .................................................. 73/81
[51] Int. Cl. ............................................. G01n 3/42
[58] Field of Search ........................................ 73/81

[56] References Cited
UNITED STATES PATENTS

| | | | |
|---|---|---|---|
| 2,834,202 | 5/1958 | Cook | 73/81 |
| 2,834,203 | 5/1958 | Sampson | 73/81 |
| 3,194,061 | 7/1965 | Sorensen et al. | 73/81 |
| 3,540,270 | 11/1970 | Wolfer | 73/78 |
| 3,552,200 | 1/1971 | Hermanns et al. | 73/146 |
| 3,577,780 | 5/1971 | Sperberg | 73/146 |

*Primary Examiner*—James J. Gill

[57] ABSTRACT

A method and apparatus for testing and measuring hardness such as roll hardness or hardness of a single or multiple layers of material having a somewhat compressible surface. Contactor means are applied to a material having a compressible surface at a known force-loading ratio and permit generation of electrical signals proportional to this ratio which are used to provide an accurate indication of the hardness of the material. The apparatus and method can be used in a static or dynamic mode of operation. The method and apparatus may be used with either one or two contactor members which contact the compressible surface at known force loadings.

27 Claims, 10 Drawing Figures

APPARATUS FOR MEASURING THE HARDNESS OF MATERIAL

This application is a continuation-in-part of our copending application, Ser. No. 85,928, filed Nov. 2, 1970 entitled "Roll Hardness Device", now abandoned.

The present invention relates to an apparatus and method for measuring the hardness of any compressible surface whether such surface is or may become flat, round or irregular. More specifically, the present invention relates to an apparatus and method to obtain a reading of the hardness of one or more layers of material which have a somewhat compressible surface by compressing the surface at determined force-loading ratios and deriving electrical signals proportional to this ratio which represent the material hardness.

Testing for the hardness of materials, such as one or more layers of material in sheet or roll form or in bulk form has been performed in many industries. This need for hardness measurement is particularly important in manufacturing industries since material hardness is one of the important parameters used in many functions such as quality control, marketing and the like. Generally the extant testing procedures rely upon techniques which are relatively unsophisticated and which are only capable of providing rough approximation of material hardness at best. The problem of hardness measurement has been particularly pronounced in testing the degree of the hardness of roll material.

Roll hardness testing on a paper machine at the reel-up has traditionally been evaluated by a method employing a backtender's "billy-stick." The rebound of the stick when it strikes a reel gives an indication of hardness which an experienced backtender uses (by adjusting calendar air showers and friction pads accordingly) for some degree of control.

More scientific attempts to apply a more specific indication of roll hardness were made using modifications of the Shore scleroscope test. A steel weight was dropped down a tube onto a wound roll, and the height of the rebound measured. A correlation was discovered between the bounce height and caliper. This bounce test is still used occasionally, but is somewhat impractical due to the size of the apparatus and the care required to ensure the testing tube is held in a relatively vertical position.

Yet another test, which was initially designed for testing the compressive strength of concrete, has been used for paper roll hardness testing and in the testing of other forms of layered or stacked material. In this test, a hammer is impacted onto the surface of the roll or of the layers of material by the release of a spring. The rebound of the hammer is then indicated on a scale, thereby providing an indication of hardness of the roll or layer or layers of material.

Recently, an instrument based on the principle of the hammer but incorporating a piezoelectric crystal mounted on the hammer head has been used to obtain a hardness indication. This instrument is hand-held and its piston impelled against the material surface by a spring or the like. However, this instrument was found to be relatively ineffective when used on rotating rolls or other moving bodies of material since it often produces a variable indication of hardness. Even on static bodies the instrument was not found to be consistently reliable.

It is therefore, the primary object of the present invention to provide a system for determining the hardness of one or more layers of material by contacting the material with a member less compressible than the material and generating electrical signals in response to the force-loads generated during the contacting of the material.

It is another object of the present invention to provide an apparatus of the type stated which is capable of operating on either a static measurement basis or a dynamic measurement basis.

It is a further object of the present invention to provide an apparatus of the type stated which is capable of measuring hardness by determining force-loadings used in compressing the surface of the material at one or more spaced locations.

It is an additional object of the present invention to provide an apparatus of the type stated which is capable of measuring the hardness of materials in either roll or stacked form or material in individual layers or in bulk form and which material may be stationery or moving.

It is also an object of the present invention to provide an apparatus of the type stated which is highly efficient and which can be manufactured and used on a relatively economical basis.

With the above and other objects in view, our invention resides in the novel features of form, construction, arrangement and combination of parts presently described and pointed out in the claims.

Broadly speaking, the present invention relates to an apparatus for determining the hardness of one or more layers of material which may be in stacked or layered form, in bulk form, or in roll form. Furthermore, the apparatus of the present invention is operable for measuring the hardness of material which is either stationery or moving with respect to the location of measurement.

The apparatus of the present invention can be broadly described as a mechanism for measuring the hardness of at least one layer of sample material to be tested which has a compressible surface. The apparatus comprises contactor means which are relatively uncompressible with respect to the sample material and are located to be engageable with the sample material. Motive means are provided for moving the contactor means into engagement with the compressible surface and causing at least one slight indentation therein under a determined force-loading expressible as a ratio of force-loads. The apparatus also includes signal generating means which are operatively associated with the contactor means for generating electrical signals in proportion to the force-loads which are created when the contactor means are urged into the compressible surface. In addition, the apparatus includes circuit active means which are operatively connected to the signal generating means and operable with respect to the electrical signals to enable generation of a hardness indication of the sample material from these electrical signals.

In more specific terms, the apparatus of the present invention is operable in a static mode of hardness determination in which case the detector mechanism comprises one or more contactors which are urged into engagement with the compressible surface with a known or measurable force. In this case, the detector mechanism may assume the construction of a pair of contactors which may be located in spaced relationship with respect to each other for contact in the compressible surface at spaced locations. In a preferred embodiment, a first contactor and a second contactor whose contact surface is at least as large as that for the first contactor will be used. The second contactor will consist of two surfaces, a small inner contact surface responsive to and able to sense a force-load, surrounded by an outer contact surface non-sensing and non-responsive to said force-load. The second contactor is pressed into a compressible surface with a force-load such that the entire small inner contact surface and preferably only that surface will be engageable with the hardest surface of the range of compressible surfaces to be tested, or alternatively, the size and shape of said small surface is such that a desired force-load can be used in which the said engageability condition is met. The contact surface of the first contractor is such that its entire surface (or less than its entire surface) will be responsive to a force-load and engageable with the softest surface of the range of compressible surfaces to be tested. The first contactor is pressed into the same compressible surface and with the same force-load as that used with/for the second contactor such that in responding to the force-load it will be able to sense the total force-load being exerted on either contactor. Thus, when both contactors are pressed unto a compressible surface with the same total force-load, the ratio of the actual force-load sensed by the small inner surface of the second contactor to the total force-load sensed by the first contactor will indicate the relative hardnesses of the range of compressible surfaces to be tested. Where the total-force-load is known and constant the ratio can be determined without the use of the first contactor. It is also possible to use a detector means where the small inner surface of the second contactor is located within and surrounded by the first contactor but exposed with respect to the compressible surface so that each of the contactors simultaneously is engageable with the compressible surface. In this case, the ratio of the total force, which is measured by the sum of the force-loads sensed by both contactors, to the center force-load, which is measured by the small contactor, is a measure of the hardness of the compressible surface. These force-loads under more or less static condition can be measured with known devices such as strain gauges or the like.

In a still further embodiment of the present invention, it has been found that a relationship exists between total nip load and nip load over a small region at the nip center, which gives a reasonable indication of conventional roll hardness, i.e. the ratio of $(p/p_t)$ (wherein $p$ = center nip load and $p_t$ = total nip load) is relatively easy to measure and provides a useful hardness scale. In applying this theory, a method and apparatus for testing roll hardness has been devised.

Thus, in one embodiment, the present invention provides a method and apparatus for the testing of hardness by obtaining a ratio between the total nip load and the center nip load and the ratio of these two loads compared to provide an indication of the roll hardness. Preferably, the total nip load is obtained by pressing a large contact button against the material to be tested and applying the load from this large contact button onto a piezoelectric crystal and doing the same with a small contact button and obtaining through circuitry a ratio of the voltages generated in the piezoelectric crystals when they are pressed against the material being tested, thereby obtaining an indication of the hardness of the material. These two contact buttons and crystals may, in this embodiment, be mounted on a disc or rotatable wheel for rolling contact with the material to be tested.

In a dynamic form of detection or sensing method, piezoelectric crystals and other similar signal generating means which involve sensing rates of change of force-loads can be used to good advantage. Furthermore, it is possible to use either one individual contactor or a pair of contactor elements as described in the above in this dynamic mode of detection. In either case, if the contactor surface is pressed into the compressible surface at a steady rate until a given force-load is reached, the voltage output of the piezoelectrical crystal or other electric signal generating member can be used to measure the rate of change of the force-load on the compressible surface. In this case, the ratio of the peak voltage from the crystal to an integration of the voltage output from the crystal represents a measure of the hardness of the compressible surface. In many cases, it is desirable to use a plurality of contactors in a spaced or concentric arrangement as described above. Several measuring circuits can be used in this dynamic mode of hardness measurement.

Thus, it has been found in connection with the present invention that when a compressible surface of a material is engaged by one or more contactor elements under a force-load the parameters of the system which generate the force-load can be expressed in the form of a ratio and the value of this ratio can then be expressed as a measure of the hardness of the compressible surface. For example, these parameters of the system include the time of engagement of the compressible surface by the contactor or contactor elements, the force with which the contactor or contactor elements are urged into the compressible surface, the type of contacting element, and even the electronic circuit employed as well. In each case, when the contactor is urged into the compressible surface under a particular force-load, the contactor or plurality of contactors will engage the compressible surface at more than one location to thereby generate a force-load ratio. In addition, signal generating elements such as piezoelectric circuits and the like may be used to generate electrical signals in response to and in proportion to these force-loads. These signals are then compared in a proper circuit for depiction of the hardness of the materials.

Figure 1:
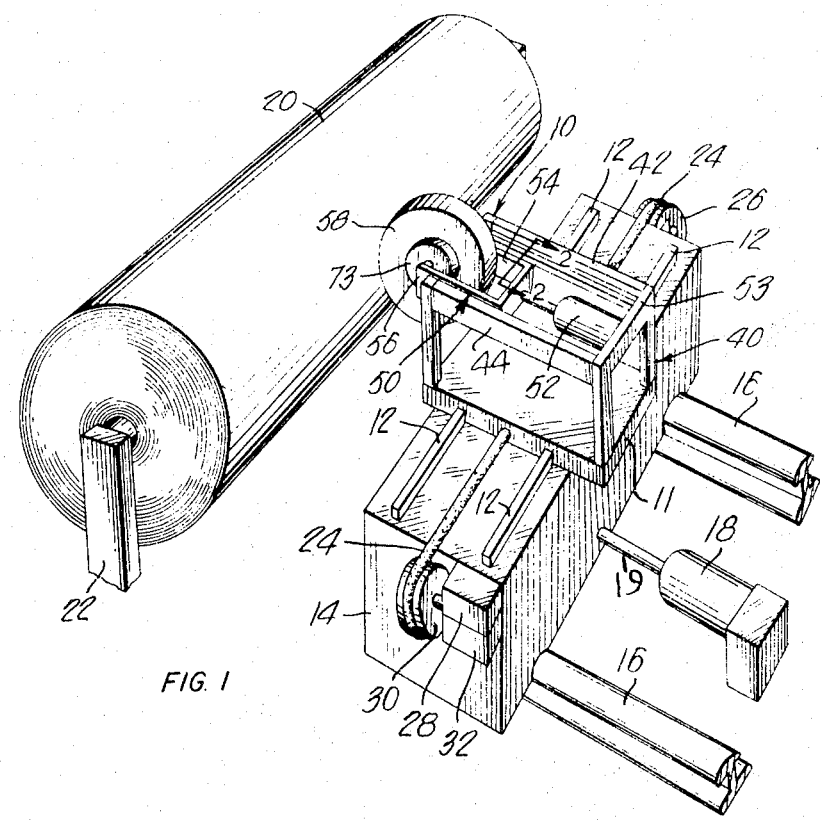
FIG. 1 is an isometric schematic view of a roll hardness tester constructed in accordance with and embodying the present invention.

Referring now in more detail and by reference characters to the drawings which illustrate practical embodiments of the present invention, one embodiment of the subject apparatus referred to as a "hardness testing device" 10 is illustrated in FIG. 1 and shows the use of the device in the measurement of hardness of rolls of material. However, it should be understood in connection with the present invention that any of the subject apparatus can be used in the measuring of the hardness of one layer of material or of a plurality of layers of material in stacks, in bulk, or in other forms. Thus, while the apparatus of the present invention is shown and described in an environment where used as a roll hardness tester, this is only one possible form of use which has been adapted for purpose of describing one embodiment of this apparatus, but the invention is not so limited and can be used in a wide variety of environments and applications.

As shown in FIG. 1, the hardness testing device 10 of the present invention is mounted on a carriage 11 which, in turn, is mounted on tracks 12 on a pedestal 14. The pedestal 14 is mounted on a second set of tracks 16 secured to the floor of the building or other supporting structure and is movable on the tracks 16 toward and away from a paper roll 20 on a roll winder, a part of which is indicated at 22. The pedestal 14 is driven by means of an electric drive arrangement including an electric motor 18 which operatively moves a drive shaft 19 in a reciprocative manner and hence shifts the pedestal 14 toward and away from the roll winder 22. However, it should be recognized that other forms of drive mechanism could be used including pneumatic or hydraulic cylinder drives or the like.

The carriage 11 is mounted on the tracks 12 for movement that may be controlled automatically or manually by means of a continuous cable 24 passing through and over the top of the pedestal 14 and connected to opposite sides of the carriage 11. The cable 24 is trained around and guided by a pulley 26 which is journalled for rotation on the pedestal 14 and a pulley 30 which is driven by a motor 28. As indicated above, the motor 28 may be automatically controlled by a suitable automatic control mechanism schematically illustrated at 32 or by a manual arrangement such as push button switches or the like (not shown) which may operate in conjunction with and override the automatic control 32.

Figure 2:
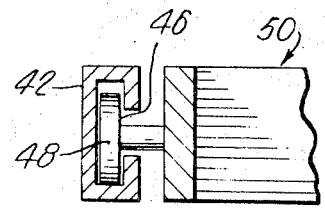
FIG. 2 is a fragmentary vertical sectional view taken along the line 2—2 of FIG. 1.
Figure 3:
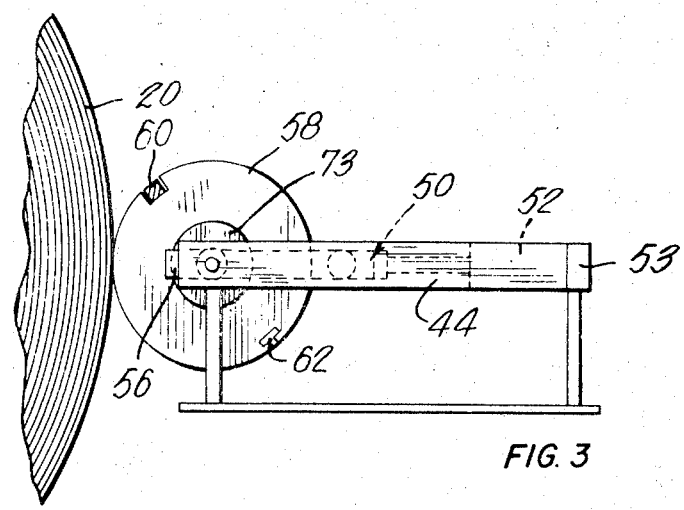
FIG. 3 is a schematic side elevational view of a portion of the carriage mechanism forming part of the hardness tester of the present invention.
Figure 4:
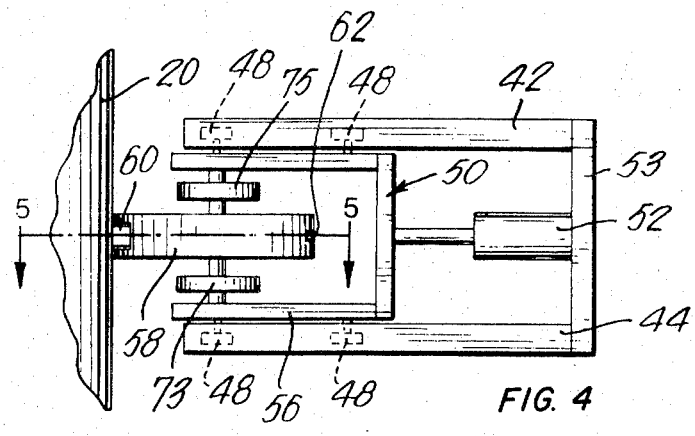
FIG. 4 is a schematic top plan view of a portion of the carriage mechanism of the hardness tester of the present invention.

The hardness tester device 10 includes a frame 40 mounted on the carriage 11 and having a pair of upper side rails 42 and 44 each provided with a slot 46 therein (see FIG. 2, only one shown) and adapted to receive the wheels 48. These wheels 48 are mounted on shafts projecting laterally from a U-shaped sub-frame 50. The bridge of the U-shaped sub-frame 50 is connected by a piston and cylinder arrangement 52 to the rear frame member 53 of the main frame 40. Operation of the piston and cylinder arrangement 52 moves the U-shaped sub-frame 50 in and out while the frame 50 is supported on the wheels 48 which roll in the slots 46 in the side rails 42 and 44. However, it should again be recognized that other forms of drive means could be used in place of the cylinder and piston arrangement 52.

Rotatably mounted between the free ends of arms 54 and 56 which integrally form a part of the U-shaped sub-frame 50 is a disc 58 or so-called "wheel." Mounted in slots formed within the periphery of the disc 58 is a detector means comprising a large contactor and a small contactor or so-called contactor buttons 60 and 62 respectively, each of which is backed up by a substantially identical signal generating mechanism, such as a piezoelectric crystal schematically indicated at 61 and 63 respectively. The crystals 61 and 63 are tightly held in their respective slots formed in the wheel periphery by the contactors 60 and 62 respectively. Thus when the wheel 58 is urged into contact with the paper roll 20, the amount of force with which the contactors 60 and 62 engage the relatively compressible paper 20 will be directly transmitted to the respective crystals 61 and 63. While piezoelectric crystals have been found to be highly effective and a preferred form of signal generating mechanism, the present invention also contemplates the use of other forms of signal generating mechanisms. For example, in many cases strain gauges and the like may be effectively used. In the present embodiment involving a "wheel," the paper roll, as it is being wound, rotates at a substantially constant speed, and this rotational velocity is imparted to the wheel during its contact with the paper roll. It is this rotational effect which provides the "rate of change" condition and controls the time element. If the roll was stationary, the wheel would have to be rotated by an independent means. Furthermore, in order that the signal generating means, involving the sensing of a rate of change, reasonably reflect the hardness of the surface relative to another surface, the speed of rotation should be reasonably constant. For signal means not involving a rate of change such as a strain gauge, variations in speed are much less critical; for such means and depending on the application the sensing time or period may be critical.

The contactors are relatively uncompressible with respect to the sample being tested. The contactors may be formed of any known materials which are selected with respect to the materials to be tested and will not be compressed to any appreciable extent when engaged with the tested material under force. Thus, the contactors may be made of plastic materials such as polystyrene, rigid polyethylene, etc., or from metals such as steel, aluminum, or the like. In this connection the hardness testing devices may be used in the testing of any of a number of known materials such as paperboard, paper, metal foil such as aluminum or magnesium foils, metal sheets or other forms of sheet or roll stock.

In the illustrated arrangements, the contactor buttons 60 and 62 are diametrically opposed; although this arrangement is not essential and it is generally desirable to have the contactors relatively close together. Ideally, from a location point of view, the small contactor button could be positioned at the center of the large button in a manner to be hereinafter described. In many cases the exact location of the contactors will depend on the intended end use of the device, e.g. whether or not the stock to be measured is moving or stationary, and the exact form in which measurements are to be made. The arrangement of the contactors is to some extent also dependent on the geometry of the final device and the relative sizes of the components. For convenience on the small disc shown, they have been, as above indicated, positioned 180° apart. Furthermore, the large contactor button 60 should preferably have a contact area about ten times as great as the contact area of the small button 62.

Figure 5:
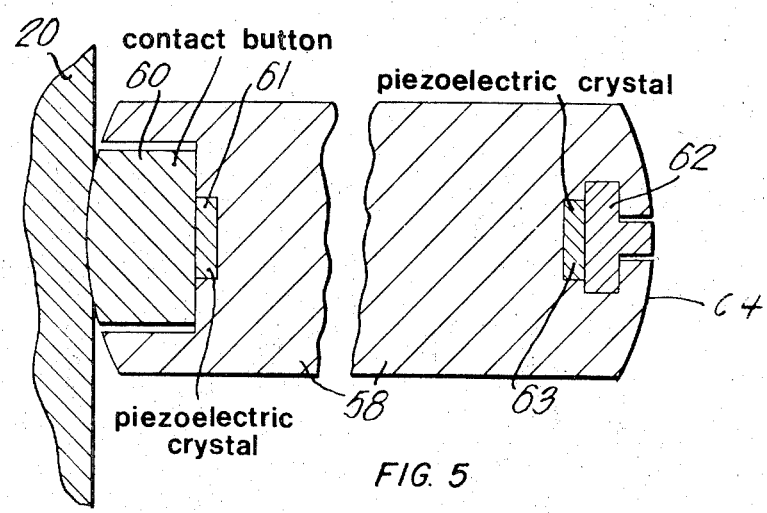
FIG. 5 is an enlarged sectional view taken along line 5—5 of FIG. 4 and showing a portion of a detector mechanism used in the present invention.

The surface of the wheel or disc 58 is preferably convex is indicated at 64 in FIG. 5 so that substantially the whole surface of the contact buttons 60 and 62 contact the roll 20 to be tested. If a flat surfaced wheel or disc 58 is used, the periphery of the disc 58 adjacent the buttons at 60 and 62 will take up part of the load, thereby reducing the signal generated by and available from one of the piezoelectric crystals 61 and 63.

It is important that the whole nip contact area lie within the limits of the large button 60 so that the maximum load will be obtained and thereby provide a total nip load between the disc 58 and the sample being tested. The small contactor button 62 has a contact area that is much smaller than the nip. Preferably, the small button will have a width greater than the width of the contact area but will be smaller in the circumferential-convex direction of the disc 58. The nip contact area is generally that total area of contact existing between the somewhat arcuate face of the contactor and the engageable surface at any point in time.

As used herein the term "total nip load" is the equivalent of "total force-load" and refers to the force-load which is experienced at a signal generating mechanism when the larger of the sensing contactors engages a compressible surface during the total time of contact therewith in one engagement. The term "center nip load" refers to the force-load which is experienced at a signal generating mechanism when the smaller of the sensing contactors engages a compressible surface in one engagement at any point in time. Also, as described previously the second contactor may consist of two contacting areas: an inner sensing area and an outer non-sensing area and this concept is shown in many of the embodiments of the present application except the above described embodiment pertaining to a single button arrangement using e.g. a piezoelectric crystal. When the contactor engages the compressible surface, it will make a slight indentation therein and the size or degree of this indentation will of course vary with the type of test sample material.

When the contactors 60 and 62 are engaged with the sample under force-loads, electrical signals in the form of pulses will be generated in the crystals 61 and 63 and these pulses are amplified by circuitry to be described hereinbelow and the pulse signals are conducted from the disc 58 via slip rings 73 and 75.

The size and weight of the disc 58 can also be important as well as the relative spacing between the two contact buttons 60 and 62. As above indicated, the two contact buttons 60 and 62 should be relatively close together. Therefore, if the wheel diameter is large, obviously the two buttons cannot be mounted in diametrically opposed relationship since the areas of the roll impressed by the buttons would be spaced too far apart.

Also the diameter of the disc 58 should be maintained small to reduce the effect of changing roll diameter of the roll being tested on the readings obtained. It has been found that a one inch wide wheel, five inches in diameter, made from an aluminum material, functions satisfactorily and it has also been found that a total nip load of about ten pounds between the roll to be tested and the wheel or disc 58 provides an adequate reading without unduly indenting the roll. If large and/or heavy wheels are used, care must be taken since there is a tendency for the wheel to be bounced from the surface of the roll being tested.

Figure 6:
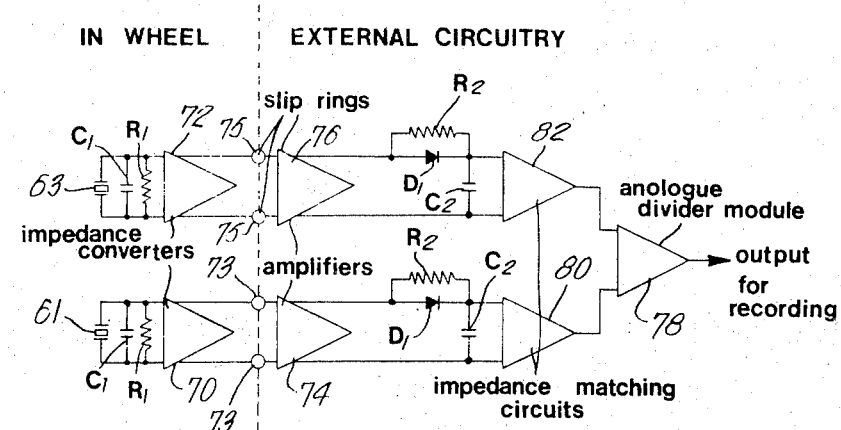
FIG. 6 is a schematic view of one form of the circuitry to be used in the present invention.

To obtain a reading or measurement of hardness, it is necessary to measure the ratio of the heights of the pulse trains from the two crystals. One form of circuitry for performing this measurement is illustrated in FIG. 6. The piezoelectric crystals at 61 and 63 each generate a train of voltage pulses produced as the contact buttons at 60 and 62 contact the roll 20. The crystals have a large internal impedance while, for transmission of the signals through the slip rings or the like, it is necessary to have a low output impedance source. For this reason, impedance converters 70 and 72 must be mounted within the wheel or disc 58. The signals from the impedance converters are conducted via slip rings 73, 75 to D.C., amplifiers 74 and 76 respectively, and the amplified signals are transmitted to integrating circuits, each consisting of a diode $D_1$, a capacitor $C_2$ and a resistor $R_2$. In each of these integrating circuits, each pulse charges the capacitor $C_2$ through the diode $D_1$, but on the decay side the output from capacitor $C_2$ cannot discharge through the diode $D_1$ as it is reverse biased and therefore the capacitor $C_2$ must discharge through the resistor $R_2$. The time constant $C_2R_2$ is chosen so that the decay in the signal between the pulses will reduce the voltage level by just enough to ensure that it will be slightly below the level of the next input pulse. While this is to some extent speed dependent, the speed of a type of machine on which the device is primarily intended for use is maintained relatively constant and this speed dependency will not present any major problems.

Figure 7:
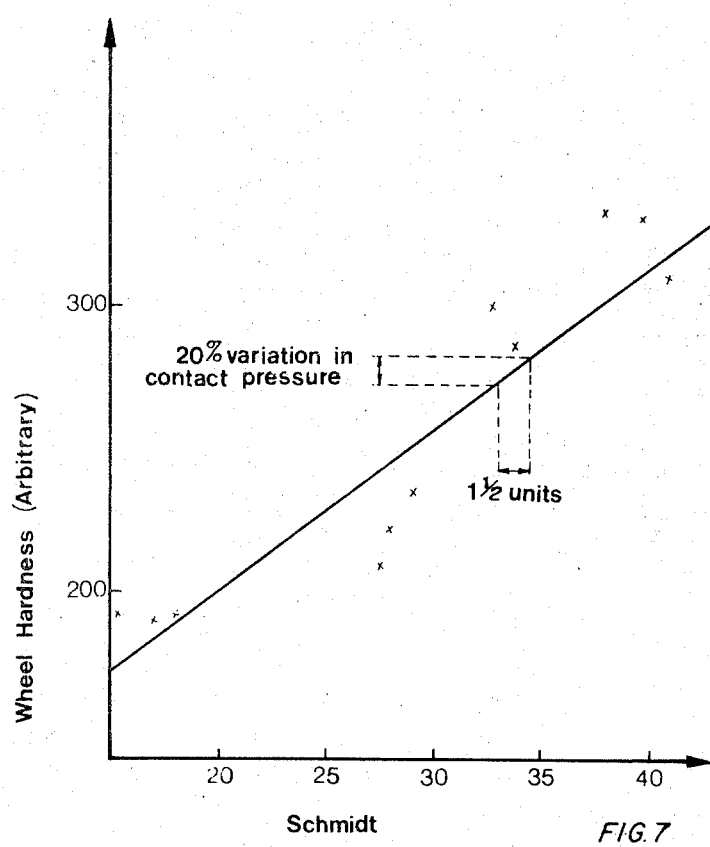
FIG. 7 is a graph showing the coordination of the test results using the present invention with those obtained using a Schmidt Hardness tester.

The two integrating circuits generate a D.C. voltage at their outputs which are proportional to the heights of the input pulses. In order to measure the ratio of these voltages, they are fed to an analog divider module 78 through impedance matchng circuits 80 and 82 respectively. The output of the divider module 78 is a D.C. voltage proportional to the ratio of the two inputs and forms a suitable signal for a print-out mechanism, or other recording mechanism such as a strip chart recorder. The output indicates the hardness of the roll 20. The circuitry may, if desired, be provided with further means not shown to correct for changes in diameter of the roll 20. It has been found that a good coordination is obtained comparing wheel hardness with Schmidt Hardness as indicated in the graph of FIG. 7.

Figure 8:
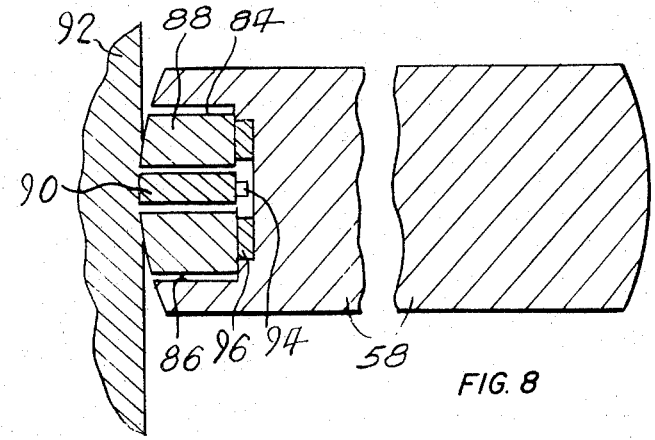
FIG. 8 is an enlarged vertical sectional view, similar to FIG. 5, and showing a portion of a modified form of the detector mechanism which forms part of the present invention.

FIG. 8 represents another modified form of detector mechanism 84 which can also be used with the apparatus of the present invention, which can be used for a non-wheel type of apparatus, or alternately locked wheel apparatus, for static use; as well as a rotatable wheel for non-static use. In this latter embodiment, this arrangement will be used with a constant movement means. For example, this detector mechanism 84 can be used in a hardness testing device which is capable of measuring the hardness of one or more layers of material in either stacked or rolled form, or material in bulk form and in addition, this detector mechanism can be used in apparatus for measuring the hardness of materials which are relatively stationery or are moving with respect to the measuring site. The detector mechanism 84 is also mounted in a slot 86 formed in the periphery of the wheel 58, in the manner as illustrated in FIG. 8, and comprises a first contactor 88 or so-called "force-load contactor" which is centrally bored to accommodate a concentric and second contactor 90 or so-called "center-load contactor." The outwardly presented surface areas of the respective contactors 88 and 90 are somewhat convex or bowl-shaped in the manner as illustrated in FIG. 8 and furthermore, these surface areas are presented outwardly from the periphery of the disc 58 so that the entire surface areas thereof may reside in contact with a compressible surface 92 of a sample material. In this case, the compressible surface 92 may represent a portion of a flat sheet of paper or other material which may be in stacked or roll form or in bulk form.

The contactor 90 is backed up by a small disc-like signal generating mechanism such as a piezoelectric crystal schematically illustrated at 94 and the contactor 88 is backed up by a similar ring-shaped signal generating mechanism such as a piezoelectric crystal schematically illustrated at 96. The crystals 94 and 96 are tightly held in the slot 86 formed in the wheel periphery by the respective contactors 88 and 90 with which they are associated. In this manner, when the wheel 58 is urged into contact with the compressible surface 92, the amount of force with the contactors 88 and 90 engage the relatively compressible surface 92 will be directly transmissed to the crystals 94 and 96. Again, the contactors 88 and 90 can be made of any of the materials used in the manufacture of the contactors 60 and 62, the important criteria being that the contactors must be relatively incompressible with respect to the material being measured.

It should be observed that the outer contactor 88 in combination with the piezoelectric crystal 96 and contactor 90 and crystal 94 measures the total force-load when the detector is brought into engagement with the compressible member. The ratio of the total force-load to the center force-load thus measured constitutes a measure of the hardness of the compressible surface relative to another similar surface for example.

It is also possible to use a detector means comprising a single contactor mechanism in place of the multiple contactors. This type of detector means is primarily useful for dynamic measurement of hardness. The piezoelectric crystals and similar electric signal generating devices are highly amenable to use with dynamic operations involving a rate of change. Thus, if a contactor is pressed against a compressible surface at a steady rate until a given force-load is reached, the voltage output from the piezoelectric crystal can be used to measure the rate of change of the force-load on the compressible surface. In this case, the smaller or center-load contactor is not generally required since the ratio of the peak voltage from the crystal to an integration of the voltage output from the crystal will serve as a measure of the hardness of the compressible surface.

Figure 9:
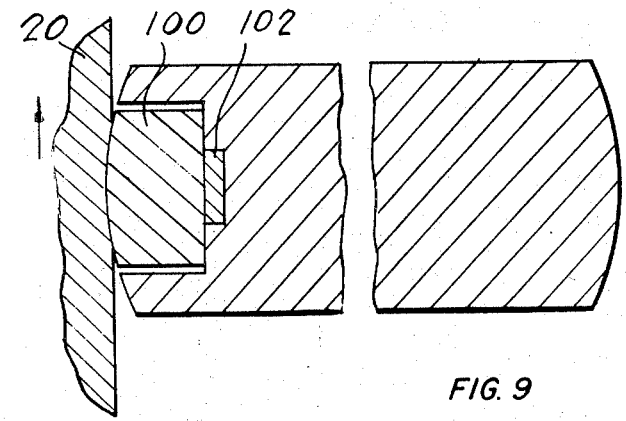
FIG. 9 is an enlarged vertical sectional view, similar to FIG. 5, and showing another modified form of detector mechanism forming part of the present invention.

FIG. 9 illustrates a wheel 58 having a detector means which comprises only one such contactor 100 and which is backed up by a suitable piezoelectric crystal 102 or other similar electric signal generating device. The contactor 100 is made of any of the materials used in the manufacture of any of the previous contactors described herein and in like manner holds the piezoelectric crystal 102 within the peripheral slot formed in the wheel 58 in the same manner as the previous piezoelectric crystals were held in place.

Figure 10:
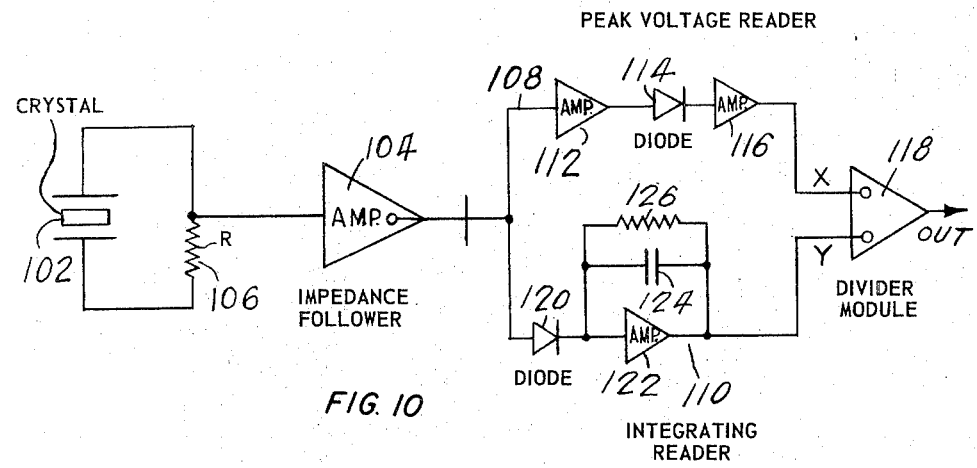
FIG. 10 is a schematic view of an alternate form of circuitry which is used in the apparatus of the present invention.

The detector mechanism which employs the single contactor is preferably used with an apparatus in conjunction with a circuit of the type illustrated in FIG. 10. In this circuit, one of the terminals of the crystal 102 is connected directly to the input of an amplifier 104 which serves as an impedance follower and the other terminal of the crystal 102 is connected through a resistor 106 to the same single input of the amplifier 104. The crystal 102 also generates a train of voltage pulses which are produced in response to force-loadings imposed through the contactor 100. The crystal 102 similarly has a large internal impedance and the impedance follower 104 which is preferably mounted within the disc 58 will lower the impedance of the signal generated through the crystal 102. The output of the impedance follower 104 is then transmitted to a peak voltage reading circuit 108 and an integrating circuit 110 in the manner as illustrated in FIG. 10. The peak voltage reading circuit comprises an operational amplifier 112 having its output connected through a diode 114 to an amplifier 116. The output of the amplifier 116 is then introduced into an analog divider module 118.

The output of the impedance follower 104 is also introduced into the integrating circuit 110 through a diode 120. The integrating circuit 110 comprises an operational amplifier 122 having a capacitor 124 and a resistor 126 connected in feedback relationship thereacross. The time constant which is generated by the capacitor 124 and the resistor 126 in the integrating circuit is properly selected so that a decay in the signal between pulses will reduce the voltage level by an amount sufficient to ensure that it will be slightly below the level of the next input pulse. Thus, the integrating circuit 110 generates an output voltage which is proportional to the height of the various input pulses. The peak voltage measurement from the peak voltage circuit 108 and the integrated average of the various peaks are both combined in the divider module 118. In this case, the ratio of the peak voltage from the crystal with respect to the integrated voltage average output from the crystal will represent a measure of hardness of the compressible surface.

Thus, it can be observed that as a single contactor arrangement illustrated in FIG. 9 scans the pressure profile of the compressible surface, the signal from the piezoelectric crystal 102 reflects the shape of this profile which, in turn, reflects the hardness of the surface. The peak voltage, which is proportional to the rate of change of the force-load with time, is a convenient measurement of the hardness of the surface and the integration of the voltage output tends to reflect the total force-load so that a ratio of the two values corrects for any change in the total load during the operation of the device. In all of the above embodiments involving a rotatable wheel or the like, the time element is maintained under control by maintaining the rotation of the speed of the wheel substantially constant. In embodiments involving non-rotational detectors, such as a probe moving linearly, the time element is maintained under control by moving the probe at a substantially constant velocity. The amount of speed variation that can be tolerated will depend on the particular application to which the apparatus and method of the present invention is employed.

The output of the circuit 118 or 78 is a D.C. voltage proportional to the ratio of the input and thereby forms a suitable signal for rendering a visual indication of the degree of hardness. This signal can be corrected to a conventional print-out mechanism or other recording mechanism such as a strip chart recorder. If desired, the output from the devices of the present invention may be used to control the operation of auxiliary devices as for example, adjusting the tension or other characteristics of a roll or stacks of material being produced; as well as in microcontrol systems. It can be observed that since only a small device is required, and a uniform pressure is generally maintained in measuring of hardness, the output from the signal generating means can be used as a source of control pulses to regulate essentially any form of auxiliary equipment.

Many changes, modifications, variations and other uses and applications of the hardness testing mechanism of the present invention will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow:

We claim:

1. A hardness tester comprising a support means, means for indicating the total load between said support means and the sample to be tested, means on said support means for sensing the center nip load over a small region at the center of the nip between said support means and said sample to be tested, means for pressing said tester against said sample, and circuitry interconnecting said means for indicating the total load and said means for sensing the center nip load to obtain a ratio of said total load and said center nip load.

2. A tester as defined in claim 1, wherein said support means is a wheel and said means for sensing the center load is mounted on the periphery of said wheel for rolling contact with said sample.

3. A tester as defined in claim 2, wherein said means for sensing said center load includes a piezoelectric crystal and means to actuate said crystal.

4. A hardness tester as defined in claim 1, wherein said means for indicating the total nip load is mounted on said support means and includes a larger means actuating a piezoelectric crystal, and wherein said means for sensing said center nip load includes a smaller means actuating a piezoelectric crystal.

5. A tester as defined in claim 4, wherein said support means is a wheel and said larger and smaller means are mounted on the periphery of said wheel for rolling contact with said sample.

6. A tester as defined in claim 5, wherein said periphery has a convex cross section.

7. A tester as defined in claim 6, wherein said larger means has a contact area at least tenfold the contact area of said smaller means.

8. A hardness tester as defined in claim 7, further comprising circuitry interconnecting said crystals and registering the ratio of voltage generated in said one and said other crystals.

9. A hardness tester as defined in claim 7, wherein said sample is a rotating roll, and further comprising means for laterally moving said hardness tester relative to said roll to permit obtaining an indication of roll hardness at spaced locations axially of said roll.

10. A hardness tester comprising a support means, detector means operatively mounted on said support means and including a first contactor means for sensing a total force-load existing between said support means and the sample to be tested when said detector means is urged into contact with the sample to be tested, said detector means also including a second contactor means for sensing the center nip load over a small region at the center of the nip between said detector means and said sample to be tested, said contactor means being relatively incompressible with respect to the sample to be tested and the total surface of said second contactor means coming in contact with said sample, means to combine the values of said total force-load and said center nip load as provided by said detector for indicating the hardness of said sample, and means operatively connected to said support means for permitting relative movement between said support means and said sample.

11. The hardness tester as defined in claim 10 wherein said detector means includes a piezoelectric crystal located to be actuated by one of said contactor means.

12. The hardness tester as defined in claim 10 wherein a first piezoelectric crystal is associated with and actuated by said first contactor means and a second piezoelectric crystal is associated with and actuated by said second contactor means.

13. A tester as defined in claim 10 wherein said support means is a wheel and said detector means is mounted on the periphery of said wheel for rolling contact with said sample.

14. A tester as defined in claim 10 wherein the periphery of said wheel has a convex cross-section.

15. A hardness tester as defined in claim 12 further comprising circuitry interconnecting said crystals and registering the ratio of voltage generated in each of said crystals.

16. A hardness tester as defined in claim 10 wherein said sample is a rotating roll, and further comprising means for laterally moving said hardness tester relative to said roll to permit obtaining an indication of roll hardness at spaced locations axially of said roll.

17. A method of obtaining an indication of hardness of a sample comprising generating a signal indicating the total nip load between said sample and a testing device, stressing a piezoelectric crystal smaller in area than the nip formed between said sample and the testing device to obtain an indication of center nip load over a small area at the center of the nip, comparing the total nip load with the center nip load to obtain a ratio of center nip load to total nip load, and recording the ratio to provide an indication of the hardness of the sample.

18. A method as defined in claim 17, wherein said signal indicating the total nip load is generated by stressing a piezoelectric crystal against said sample over an area larger than said small area.

19. A method as defined in claim 18, further comprising obtaining said ratios at spaced points axially of said sample to obtain a hardness profile of said sample.

20. A method as defined in claim 18, further comprising rotating said piezoelectric crystal about an axis by relative movement of said sample and said crystal.

21. An apparatus for measuring the hardness of the surface of a sample material by a contactor-sensing surface where said sample and contactor-sensing surface are capable of coming together to form an indentured area non-uniformly compressed whose pressureprofile characteristics are measurable by said contactor-sensing surface, said apparatus comprising contactor-sensing means containing said contactor-sensing surface which is relatively incompressible with respect to said sample surface and located to be directly engageable therewith, signal generating means operatively associated with said contactor-sensing surface for generating electrical signals at least one signal of which reflects the shape of said pressure profile and circuit active means operatively connected to said signal generating means, motive means to keep said contactor-sensing means in contact with said sample surface permitting engagement of said contactor-sensing surface with said sample surface so as to form said compressed area between said contactor-sensing surface and said sample surface, the position and nature of said contactor-sensing surface and said signal generating means and said circuit active means and said motive means being such as to create measurable values which are electrical in nature and are proportional to said characteristics of said compressed area, said circuit active means operable with respect to at least one of said electrical signals so as to form a further value and to produce an output signal proportional to said further value which output signal shall serve as an indication of the hardness of said sample material.

22. The apparatus of claim 21, wherein said apparatus being further characterized in that said contactor-sensing surface comprises first and second contactor-sensing surfaces and where said first contactor-sensing surface senses a characteristic of said pressure-profile which is the total force-load acting at said compressed area and said second contactor-sensing surface senses a further characteristic of said pressure-profile which is the shape of said pressure profile, and said signal generating means comprises an individual signal generating means associated with each of said first and second contactor-sensing surfaces respectively to generate electrical signals to form said measurable values which are proportional to said total force-load and said pressure-profile shape respectively, and said circuit active means is operable to manipulate said values to form said further value as a ratio and to produce said output signal which is a hardness indication of said sample material.

23. The apparatus of claim 21, further characterized in that said contactor-sensing surfaces comprises a single contactor-sensing element and said signal generating means comprises a single signal generating means capable of producing a train of voltage pulses which build up to a peak voltage and then decays such that said train of pulses and said peak voltage constitute said measurable values and said circuit active means is operable to integrate said train of pulses to form a first value which is proportional to a characteristic of said pressure-profile which is the total force-load acting at said compressed area and operable to identify said peak voltage to form a second value which is proportional to a further characteristic of said pressure-profile which is said pressure-profile shape of said compressed area and operable to manipulate said first and second values to form said further value as a ratio and to produce said output signal which is a hardness indication of said sample material.

24. The apparatus of claim 21, further characterized in that said contactor-sensing surfaces comprises a single contactor-sensing element and said generating means comprises a single signal generating means capable of producing a train of voltage pulses which build up to a peak voltage and then decays such that said train of pulses and said peak voltage constitute said measurable values and wherein the integration of said train of pulses is capable of being formed into a first value which is proportional to a characteristic of said pressure-profile which is the total force load acting at said compressed area but which is sufficiently constant so as not to substantially affect a second value and said circuit active means is operable to identify said peak voltage to form said second value which is proportional to a further characteristic of said pressure-profile which is said pressure-profile shape of said compressed area and operable to form said further value and to produce said output signal which is a hardness indication of said sample material.

25. The apparatus of claim 21, further characterized in that said contactor-sensing surface is mounted on the periphery of a wheel which is movable with respect to said sample surface, and which is shiftable with respect to said sample material, and further means are included to move and shift said wheel so that said contactor means engages various locations on said sample material along a particular axis, and said signal generating means is a piezoelectric crystal, and said circuit active means further includes a means to convert said output signal into a signal suitable for a print-out such that said print-out will record a series of said output signals which series of signals shall indicate the hardness record of said sample at said various locations along said axis.

26. A method of obtaining an indication of the hardness of a sample comprising pressing the testing surface of a testing device against the surface of said sample with a substantially constnt force-load such that an indentured compressed area is formed between said testing surface and said sample surface, sensing with a sensing surface contained in said tesing surface the force-load carried by an area smaller than that of said indentured area such that no further significant indention is made in said sample surface by said sensing surface, generating a signal in proportion to said force-load and converting said signal into an indication of the hardness of said sample.

27. A method of obtaining an indication of the hardness of a sample comprising pressing the testing surface of a testing device against the surface of said sample with a total force-load such that an indentured compressed area is formed between said testing surface and said sample surface, sensing the said total force-load, sensing with a sensing surface contained in said testing surface the force-load carried by an area smaller than that of said indentured area such that no further significant indentation is made in said sample surface by said sensing surface, generating signals respectively in proportion to said total force-load and said force-load respectively and obtaining a ratio therebetween and converting said ratio into a further signal which is an indication of the hardness of said sample.

* * * * *